US012716293B2

(12) United States Patent
Riemelmoser

(10) Patent No.: US 12,716,293 B2
(45) Date of Patent: Aug. 25, 2026

(54) BLOCKOUT BLIND SYSTEMS

(71) Applicant: COMMERCIALISATION EXPRESS PTY LTD, Salisbury Heights (AU)

(72) Inventor: John Riemelmoser, Salisbury Heights (AU)

(73) Assignee: Commercialisation Express PTY LTD, Salisbury Heights (AU)

( * ) Notice: Subject to any disclaimer, the term of this patent is extended or adjusted under 35 U.S.C. 154(b) by 148 days.

(21) Appl. No.: 18/834,051

(22) PCT Filed: Jan. 30, 2023

(86) PCT No.: PCT/AU2023/050050
§ 371 (c)(1),
(2) Date: Jul. 29, 2024

(87) PCT Pub. No.: WO2023/141678
PCT Pub. Date: Aug. 3, 2023

(65) Prior Publication Data

US 2025/0129668 A1 Apr. 24, 2025

(30) Foreign Application Priority Data

Jan. 30, 2022 (AU) ................................ 2022200593

(51) Int. Cl.
*E06B 9/58* (2006.01)
*E06B 9/42* (2006.01)
*E06B 9/78* (2006.01)

(52) U.S. Cl.
CPC ................ *E06B 9/582* (2013.01); *E06B 9/42* (2013.01); *E06B 2009/583* (2013.01); *E06B 2009/588* (2013.01); *E06B 2009/785* (2013.01)

(58) Field of Classification Search
CPC ...... E06B 9/582; E06B 9/42; E06B 2009/583; E06B 2009/588; E06B 2009/785
See application file for complete search history.

(56) References Cited

U.S. PATENT DOCUMENTS

| | | | | |
|---|---|---|---|---|
| 922,151 A | | 5/1909 | Kelsey | |
| 3,292,685 A | | 12/1966 | Clark | |
| 4,357,978 A | | 11/1982 | Keller et al. | |
| 4,393,915 A | * | 7/1983 | Olson | A47H 23/01 160/395 |
| 4,649,981 A | | 3/1987 | Bibeau | |

(Continued)

FOREIGN PATENT DOCUMENTS

| | | | |
|---|---|---|---|
| AU | 2020277286 B1 | 2/2021 | |
| CA | 2946023 A1 | 5/2017 | |

(Continued)

*Primary Examiner* — Beth A Aubrey
(74) *Attorney, Agent, or Firm* — Sand, Sebolt & Wernow Co., LPA

(57) ABSTRACT

A blockout blind system includes a pelmet with a roller blind fitted and at least one strip attached to the pelmet and forming a light seal against the blind. A single flexible strip may drape over the top of the blind, or a front and rear flexible strip may instead drape over the front and rear of the blind, or a semi-rigid resilient strip may be deflected by the blind to form the light still. Additionally, a cross rail at the bottom of the blind is free to move vertically with respect to the blind to provide an effective light seal agains a non-horizontal window sill.

8 Claims, 5 Drawing Sheets

(56) References Cited

U.S. PATENT DOCUMENTS

| | | | | |
|---|---|---|---|---|
| 5,535,806 | A | 7/1996 | Kold et al. | |
| 9,976,346 | B2 * | 5/2018 | Ng | E06B 9/42 |
| 11,180,951 | B2 * | 11/2021 | McNeill | E06B 9/42 |
| 11,332,974 | B2 * | 5/2022 | Chiquin | E06B 9/42 |
| 2004/0129391 | A1 * | 7/2004 | Gottschall | E06B 9/42 160/238 |
| 2012/0012261 | A1 | 1/2012 | Santoro et al. | |
| 2012/0097346 | A1 * | 4/2012 | Ng | E06B 9/388 160/264 |
| 2013/0220559 | A1 | 8/2013 | Dwarka | |
| 2014/0251553 | A1 | 9/2014 | Farntrog | |
| 2017/0009519 | A1 * | 1/2017 | Marocco | E06B 9/24 |
| 2022/0341257 | A1 * | 10/2022 | Riemelmoser | E06B 9/582 |

FOREIGN PATENT DOCUMENTS

| | | | |
|---|---|---|---|
| DE | 694371 | | 7/1940 |
| DE | 19935729 | A1 | 2/2001 |
| EP | 1318267 | A2 | 6/2003 |
| FR | 2141645 | A1 | 1/1973 |
| FR | 2544788 | A1 | 10/1984 |
| GB | 2462928 | A | 3/2010 |
| JP | S6351590 | A | 3/1988 |
| JP | 2013136900 | A | 7/2013 |
| JP | 2016211361 | A | 12/2016 |

* cited by examiner

BLOCKOUT BLIND SYSTEMS

FIELD OF THE INVENTION

The present invention relates to window blinds, in particular improvements to blockout blind systems to reduce light leakage at the top of a blind and to cope with variations in window apertures.

BACKGROUND TO THE INVENTION

Blockout blinds are used to block all or nearly all light from entering through a window and are often considered a necessity for shift workers. They are also becoming an increasingly popular addition to home cinemas.

Achieving 100% blockout is a challenging proposition, particularly providing a light seal at the top of the blind as the diameter of the blind changes as the blind is wound up and down. An existing solution is to drape one or more flaps of material over the blind from a pelmet. Loose flaps of material have a tendency to move with a blind as it is wound up or down, which can lead to the flaps of material being moved from a light sealing position and even getting caught between the pelmet and the top of the blind.

A further challenge for blockout blind systems is dealing effectively with misaligned window apertures, particularly non-level window sills which may lead to gaps under the bottom cross rail of a blind.

The object of this invention is to provide a blockout blind system to alleviate the above problems, or at least provide the public with a useful alternative.

SUMMARY OF THE INVENTION

In a first aspect the invention provides a blockout blind system comprising a roller blind fitted to a pelmet, and further comprising at least one light blocking strip attached along a first side to the top of the pelmet and is in contact with the roller blind to form a light seal between the light blocking strip and the blind, wherein a second side of the at least one light blocking strip is positioned away from the roller blind to prevent unwanted dislodgement.

The at least one light blocking strip may comprise a semi-rigid resilient strip attached along a first side to the pelmet, and a free second side resting against a front wall of the pelmet, wherein the blind is positioned to deflect the strip to form the light seal.

Alternatively, the light at least one light blocking strip may comprise at least one flexible light blocking strip attached along a first side and a second side to the top of the pelmet, and wherein the at least one flexible light blocking strip drapes over the roller blind.

The at least one light blocking strip may comprise a single flexible light blocking strip draping over the blind between the rear side of the blind and the front side of the blind.

The at least one light blocking strip may comprise a rear flexible light blocking strip draping over the rear side of the blind and a front flexible light blocking strip draping over the front side of the blind.

Preferably the light blocking strips comprise apertures positioned towards the first side and the second side, and the apertures towards the first side are formed in different patterns than the apertures towards the second side.

The blockout blind system may further comprise a bottom cross rail, wherein a bottom end of the roller blind is retained within the bottom cross rail in a manner such that the bottom cross rail can move vertically with respect to the bottom end of the roller blind.

In preference the bottom cross rail comprises a cavity of a first height and an access passage to the cavity of a first thickness, and wherein the bottom end of the blind comprises a thickened section of a second thickness which is greater than the first thickness and a second height which is less than the first height.

Preferably the thickened section of the blind is formed by the blind being wrapped around a spline, and wherein at least one clip envelopes the thickened section of the blind such that the spline is free to move laterally relative to the blind.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DRAWING COMPONENTS

Figure 1:
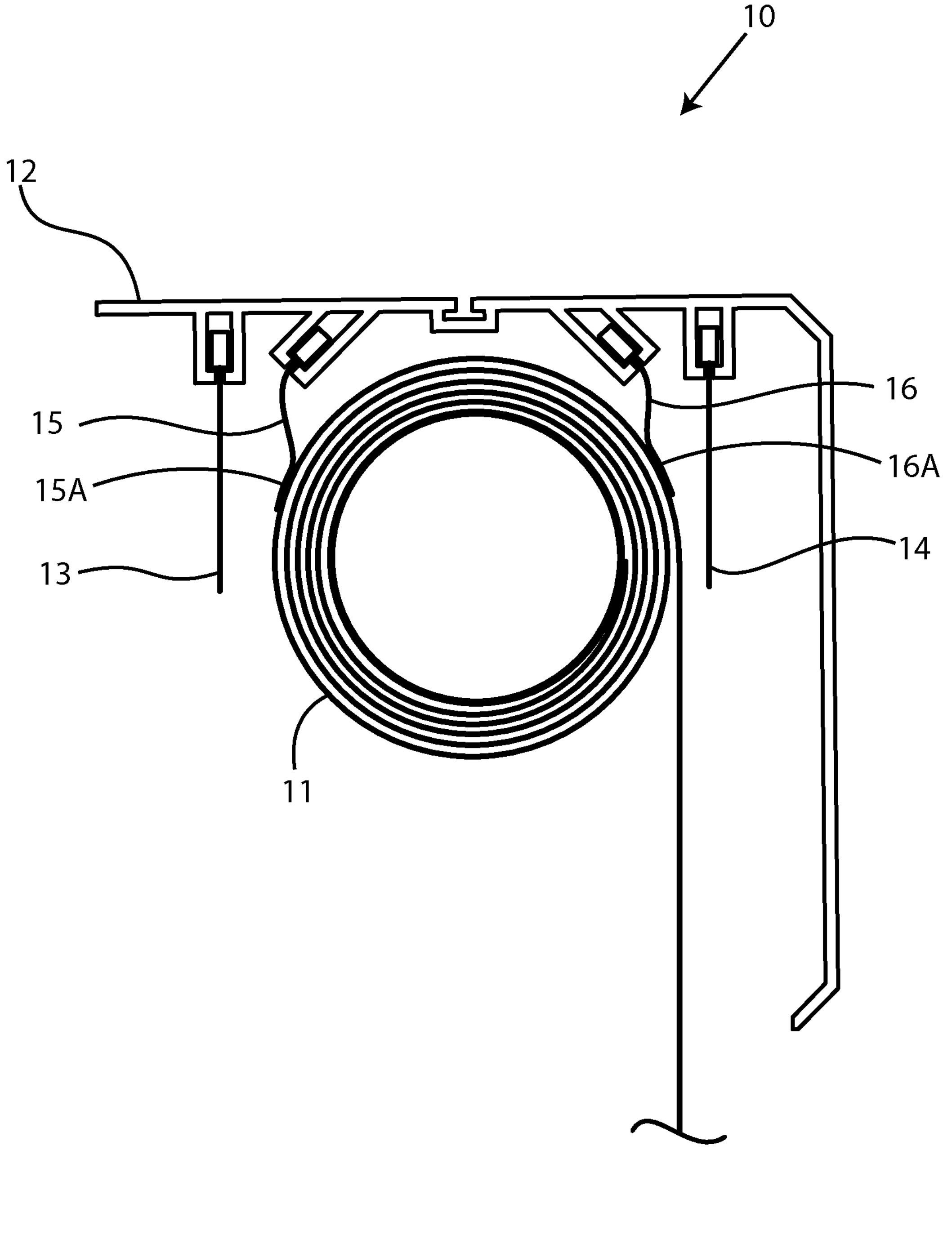
PRIOR ART Figure 1
FIG. 1 shows an end view of a prior art blockout blind system with a pelmet and top section of a blind.

The drawings include the following integers.

10 prior art blockout blind system
11 roller blind
12 pelmet
13, 14 outer flaps
15,16 inner flaps
15A, 16A flap ends
20 blockout blind system—first embodiment
22 roller blind
23 deployed section (of blind)
24 pelmet
25 pelmet top
26 attachment cavity
27 pelmet front wall

30 rear flexible light blocking strip
31 first attachment side
32 second attachment side
33 contact area
34, 35 attachment means
40 front flexible light blocking strip
41 first attachment side
42 second attachment side
43 contact area
50 blockout blind system—second embodiment
51 single flexible light blocking strip
52 rear attachment side
53 front attachment side
54 contact area
55 rear contact region
56 front contact region
60 blockout blind system—third embodiment
61 semi-rigid resilient light blocking strip
62 attachment side
63 free side
64 contact area
65 rear contact region
66 front contact region
68 auxiliary flap
70 bottom cross rail
71 body
72 cavity
73 top section of cavity
74 bottom section of cavity
75 access passage
76 seal retainer
77 sealing brush
80 bottom section of blind
81 spline
82 thickened section of blind
83 clip

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration. Rolled up sections of blind have been shown with layers of the blind separated and distanced from what they are rolled around for representational clarity.

The present invention provides improvements to blockout blind systems, in particular to providing an effective seal at the top of a blind. In a first embodiment of the invention strips of material are suspended from both sides and draped over front and rear sections of the top of the blind. In a second embodiment a single strip of material is suspended from both sides and draped across the top of the blind. In a third embodiment a semi-rigid resilient strip is attached to the top of a pelmet along a first side, and is unfixed at a second side. The strip is positioned such that the top of the blind pushes against the strip to deflect it such that it makes contact across the top of the blind, and a free end of the strip acts against the front wall of the pelmet to keep the strip in place. In all cases both sides of the light sealing strips are held away from the blind to prevent unwanted displacement. In a further aspect of the invention a bottom cross rail of a blind includes a chamber for securing the bottom of a blind with a spline. The chamber is sized so that the cross rail may move with respect to the bottom of the blind, thus compensating for non-horizontal sills to provide an effective light seal.

FIGS. 1 to 4 show the end view of a pelmet and blind with a blockout system fitted. It is to be understood that all of the components shown in these figures extend into the plane of the drawing sheets. Consequently, what appears as a two-dimensional feature is in fact a three-dimensional feature and points at the end of a line are in fact edges extending into the plane of the drawing sheet. The two-dimensional features seen in the figures are the "ends" of features, with the "sides" of the features extending into the plane of the drawing sheets. Various light sealing strips are disclosed, in each case they extend along the length of the pelmet with sides parallel to the top wall and front wall of the pelmet.

The discussion and drawings of the blackout blinds of the prior art and various embodiments of the invention focus mainly on the pelmet region and do not disclose side rails which are an integral and well known part of a blockout blind system.

FIG. 1 shows an end view of a prior art blockout blind system 10 with a pelmet 12 and top section of a blind 11 and flaps 13, 14, 15 and 16 suspended from the top of the pelmet. Outer flaps 13 and 14 provide a first light blocking function. Inner flaps 15 and 16 provide further light bocking with ends 15A and 16A draping over the blind 11 to provide a light seal against the blind. As the flaps are made of flexible material the ends 15A and 16A conform to the shape of the blind and move to keep contact with the blind as it is wound up and wound down. Undesirably, the ends of the flaps may get caught on the blind as it is wound up or down and dragged out of position over the blind. This may result in the light seal being compromised and/or the flaps being jammed between the blind and the pelmet.

Figure 2:
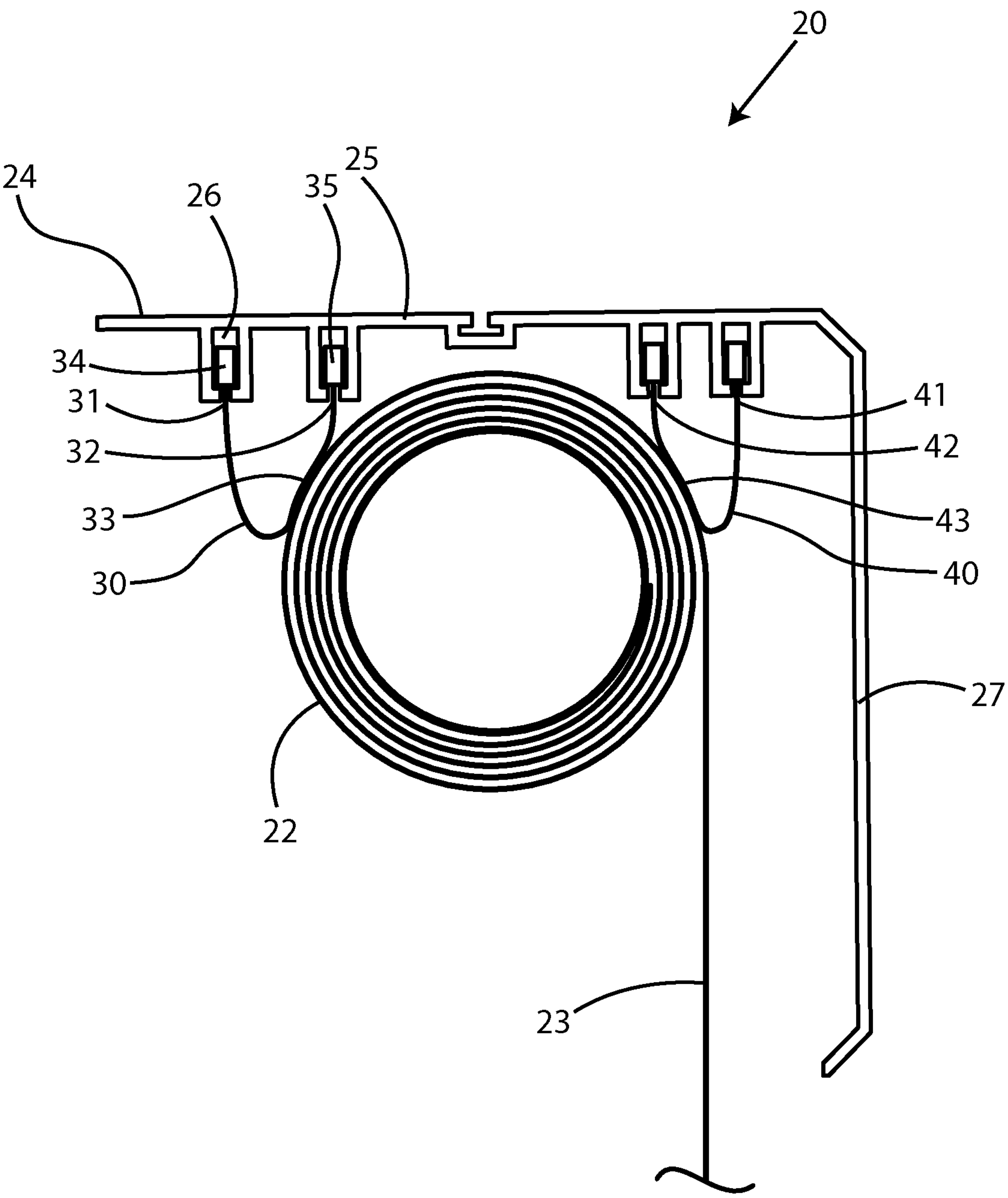
FIG. 2 shows an end view of a blockout blind system with a pelmet and top section of a blind according to a first embodiment of the invention with two separate strips of material draped over the blind.

FIG. 2 shows an end view of a blockout blind system 20 according to a first embodiment of the invention with a pelmet 24 and top section of a blind 22. A rear flexible light blocking strip 30 disposed towards the rear of the blind is attached to the top 25 of the pelmet via attachment means 34 along a first attachment side 31 of the strip (i.e. a side of the strip running along the length of the pelmet) engaging with attachment cavity 26 of the pelmet, and similarly via attachment means 35 along a second attachment side 32 of the strip. The attachment means 34, 35 may be formed separate from and then joined to the strip, or maybe a continuation of the strip wrapped around a spline. A front flexible light blocking strip 40 disposed towards the front of the blind is also attached to the top of the pelmet along first attachment side 41 and second attachment side 42. The two flexible light blocking strips 30 and 40 are made from a flexible material, such as blind material, and drape over a section of the top of the blind along contact areas 33 and 43 thus providing a light seal. As the light blocking strips are flexible, the light seal is maintained as the diameter of the blind 22 varies as it is wound up or down, and as the light strips are attached along two sides they resist getting dragged over the blind as it is wound up or down.

Figure 3:
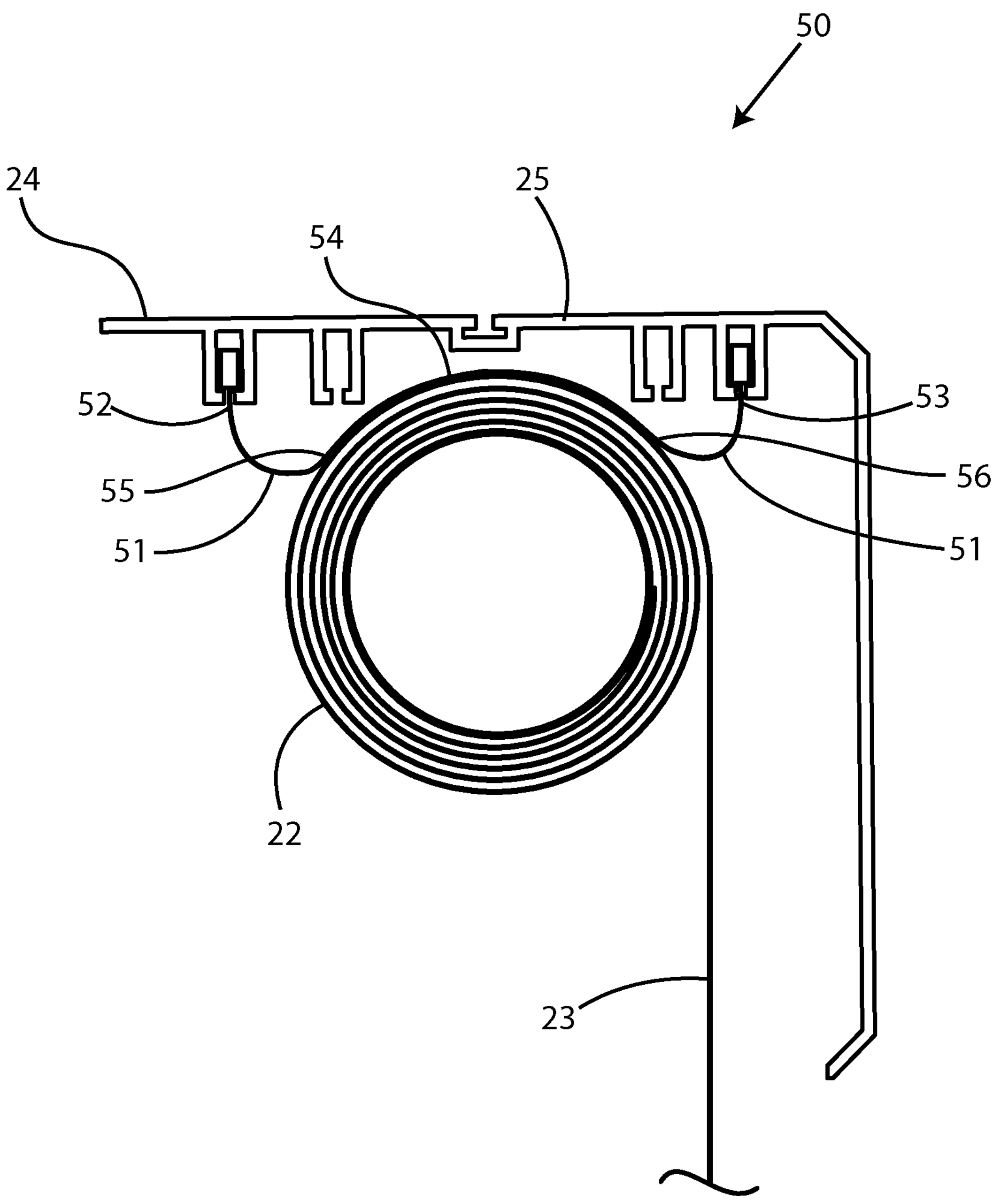
FIG. 3 shows an end view of a blockout blind system with a pelmet and top section of a blind according to a second embodiment of the invention with a single strip of material draped over the blind.

FIG. 3 shows an end view of a blockout blind system 30 according to a second embodiment of the invention with a pelmet 24 and top section of a blind 22. Compared with the first embodiment of the invention which had two separate flexible light blocking strips 30, 40 disposed towards the front and rear of the blind, the second embodiment comprises a single flexible light blocking strip 51 draped over the top of the blind from front to rear. As per the light blocking strips 30,40, the single flexible light blocking strip 51 is attached to the top 25 of the pelmet along rear attachment side 52 and front attachment side 53. Contact area 54 of the single flexible light blocking strip drapes over the top of the blind 22 from contact region 55 to contact region 56, thus providing a light seal.

The second embodiment is simpler, and thus easier and cheaper to implement, than the first embodiment, however the trade-off is that there are only two sections of blind material between the front and rear of the blind compared with four which may lead to more unwanted light paths around the blind. In a further embodiment, no shown, a single light sealing strip is attached to the inner attachment cavities and flaps such as 13 and 14 from the prior art example are attached to the outer attachment cavities.

Figure 4:
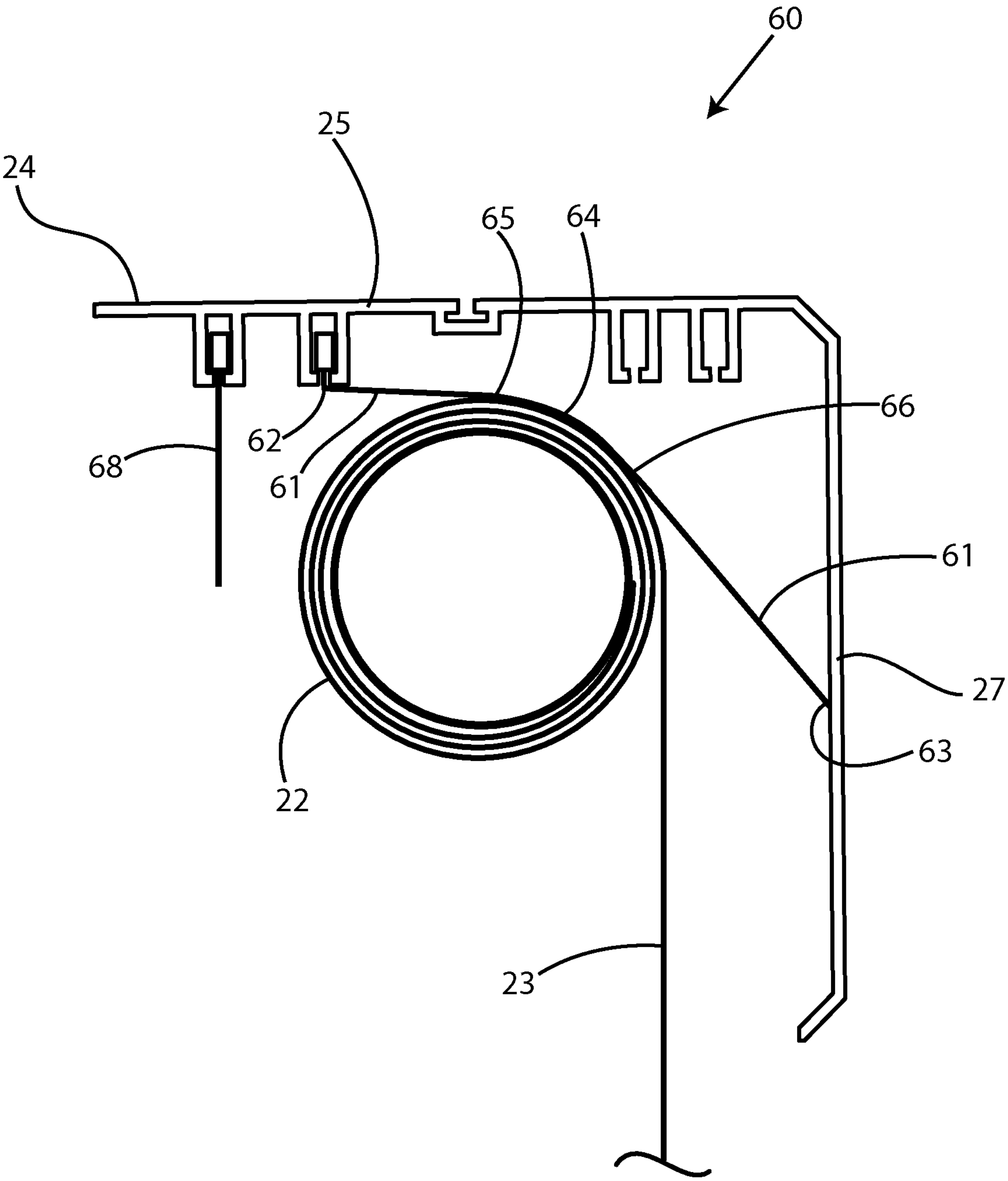
FIG. 4 shows an end view of a blockout blind system with a pelmet and top section of a blind according to a third embodiment of the invention with a semi-rigid resilient strip acting against the top of the blind.

FIG. 4 shows an end view of a blockout blind system 60 according to a third embodiment of the invention with a pelmet 24 and top section of a blind 22, which instead of flexible light blocking strips 30, 40, 51 (of blind material) has a resilient semi-rigid light blocking strip 61 which acts as an elongate spring against the top of the blind. The light blocking strip 61 is attached to the top 25 of the pelmet along attachment side 62 with free side 63 resting against the front wall 27 of the pelmet. The free side may move slightly up and down the front wall of the fron wall of the pelmet, but will remain in place away from the blind. The light blocking strip 61 is positioned such that it is deflected by and wraps around the blind along contact are 64 extending from rear contact region 65 to front contact region 66, thus providing a light seal. The spring action of the light blocking strip 61 ensures that the light seal is maintained as the blind is wound up or down. Being semi-rigid, the light blocking strip 61 is unaffected by strong winds which may displace the light blocking strips of the first and second embodiments. The light blocking strip 61 may be formed from any suitable semi-rigid resilient material such as ABS plastic or even thick blind material. Auxiliary flap 68 provides further light blocking surety.

The light blocking strips 30, 40, 50 and 61 of the three embodiments preferably include apertures adjacent the sides of the elements to allow airflow over the blind, with the apertures on either side preferably formed in different patterns from each other to minimise parallel light paths from one side of the blind to another.

Figure 5A:
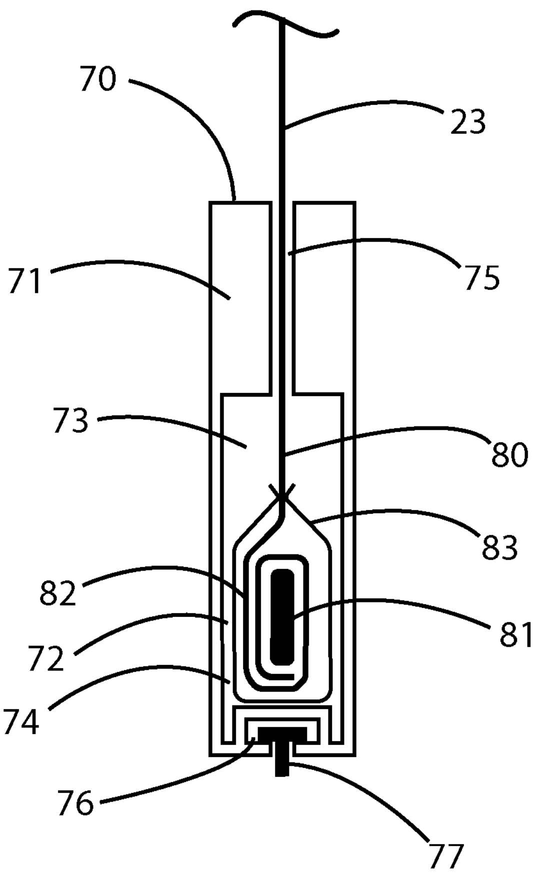
FIG. 5A shows an end view of a bottom cross rail according to a further aspect of the invention with the bottom portion of a blind positioned at its lowest position with respect to the cross rail.
Figure 5B:
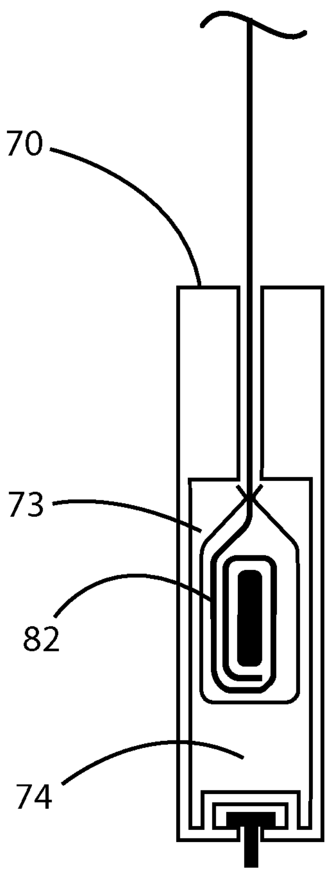
FIG. 5B shows the bottom portion of a blind positioned at its highest position with respect to the cross rail.

A bottom cross rail is typically fitted to the bottom end of the deployed section 23 of a blockout blind to provide a light seal against a window sill. A bottom cross rail 70 according to a further aspect of the invention is shown in an end view in FIGS. 5A and 5B. The cross rail 70 comprises a body 71 with cavity 72 for securing the blind, typically by the bottom of the blind within the cavity being wider than the access passage 73 which leads to the cavity 72. The cross rail further comprises a seal retainer 76 for holding a sealing brush 77. The cross rail 70 may be used independently of, or in conjunction with any of the three embodiments of the invention discussed above, or even with prior art blockout blind systems. The bottom section 80 of the blind extends through the access passage 73 and into cavity 72 where it wraps around a spline 81 to form a thickened section of blind 82, thus securing the blind within the cross rail 70. A series of clips 83 (of which the end of just one clip is shown) envelope the bottom section of the blind to maintain in its wrapped configuration. As the clips engage with the blind away from the spline, the spline is able to move laterally relative to the blind. This prevents differential thermal expansion between the blind and the spline causing unwanted effects such as bunching or stretching of the blind. The height of the thickened section 82 is less than the height of the cavity 72, thus allowing vertical movement of the cross rail with respect to the bottom of the blind. FIG. 5A shows the thickened section 82 of the blind positioned towards the bottom section 74 of the cavity whilst FIG. 5B shows the thickened section 82 of the blind positioned towards the top section 73 of the cavity. The relative movement between the blind and cross rail can vary along the length of the cross rail, thus allowing the bottom of the blind and the cross rail to be at a non-zero angle with respect to each other. This allows the bottom of the cross rail to provide an effective light sill on non-horizontal window sills.

The above disclosure has described improvements to blockout blind systems which provides effective light sealing at the top of a blind that is not susceptible to displacement by movement of the blind. A further mechanism provides for effective sealing at the bottom of a blind for non-horizontal window sills.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word “comprising” and its derivatives including “comprises” and “comprise” include each of the stated integers but does not exclude the inclusion of one or more further integers.

The invention claimed is:

1. A blockout blind system comprising:
- a roller blind;
- a bottom cross rail;
- wherein a bottom end of the roller blind is retained within the bottom cross rail in a manner such that the bottom cross rail can move vertically with respect to the bottom end of the roller blind;
- wherein the bottom cross rail comprises:
  - a cavity of a first height and an access passage to the cavity of a width;
  - wherein the bottom end of the blind comprises:
    - a thickened section of a thickness which is greater than the width and a second height which is less than the first height
- wherein the thickened section of the blind is formed by the blind being wrapped around a spline; and
- wherein at least one clip envelopes the thickened section of the blind such that the spline is free to move laterally relative to the blind.

2. The blockout blind system as in claim 1, further comprising a roller blind fitted to a pelmet, and further comprising at least one light blocking strip attached along a first side to a top of the pelmet and is in contact with the roller blind to form a light seal between the light blocking strip and the blind, wherein a second side of the at least one light blocking strip is positioned away from the roller blind to prevent unwanted dislodgement.

3. The blockout blind system as in claim 2, wherein the at least one light blocking strip comprises a semi-rigid resilient strip attached along the first side to the pelmet, and a free the second side resting against a front wall of the pelmet, wherein the blind is positioned to deflect the strip to form the light seal.

4. The blockout blind system as in claim 3, wherein the at least one light blocking strip is a single flexible light blocking strip and is attached along the first side and the second side to the top of the pelmet, and wherein the at least one flexible light blocking strip drapes over the roller blind.

5. The blockout blind system as in claim 4, wherein the at least one flexible light blocking strip comprises a single flexible light blocking strip draping over the blind between a rear side of the blind and a front side of the blind.

6. The blockout blind system as in claim 4, wherein the at least one flexible light blocking strip comprises a rear flexible light blocking strip draping over a rear side of the blind and a front flexible light blocking strip draping over a front side of the blind.

7. The blockout blind system as in claim 2, wherein the at least one light blocking strip comprises at least two light blocking strip, each of the strip defining at least two apertures each positioned proximate the first side and the second side.

8. The blockout blind system as in claim 7, wherein the aperture of the at least two apertures positioned proximate the first side is formed in different patterns than the aperture of the at least two apertures positioned proximate the second side.

* * * * *